United States Patent [19]

Evans et al.

[11] Patent Number: 4,699,818

[45] Date of Patent: Oct. 13, 1987

[54] WEATHERSTRIPPING INCLUDING METHOD AND APPARATUS FOR THE MANUFACTURING THEREOF

[76] Inventors: Robert D. Evans, 44 Tubbs Springs Dr., Weston, Conn. 06833; Robert C. Blezard, 92 Julian Rd., Harwich Port, Mass. 02646

[21] Appl. No.: 640,761

[22] Filed: Aug. 14, 1984
(Under 37 CFR 1.47)

[51] Int. Cl.$^4$ .............................................. B32B 33/00
[52] U.S. Cl. ........................................ 428/85; 156/72; 156/228; 156/285; 156/435; 428/89; 428/92; 428/95; 428/96; 428/97
[58] Field of Search ........................ 428/85, 89, 95, 92, 428/96, 97; 156/72, 435, 228, 285

[56] References Cited

U.S. PATENT DOCUMENTS

| | | | |
|---|---|---|---|
| 3,175,256 | 3/1965 | Horton | 428/92 |
| 3,404,487 | 10/1968 | Johnson | 428/92 |
| 3,616,137 | 10/1971 | Horton | 161/66 |
| 3,745,053 | 7/1973 | Johnson et al. | 428/92 |
| 4,164,599 | 8/1979 | Kessler | 482/92 |
| 4,352,845 | 10/1982 | Miska | 428/92 |

Primary Examiner—Marion C. McCamish
Attorney, Agent, or Firm—Edward D. C. Bartlett

[57] ABSTRACT

A method of manufacturing weatherstripping comprises forming a row of pile fiber on a substrate, compressing the row widthwise between a pair of dies, heating the row while so compressed, and cooling the heated row. In this way the sides of the row can be heat set for appearance, or formed into a continuous film, or the whole row converted into a barrier fin in the form of a film, depending upon the degree of compression and the temperature. Preferably the row is formed by tufting and the dies disposed immediately downstream of the tufting station. Pile fiber of conjugate polyethylene and polypropylene is advantageous in forming such films which are integrally attached to the substrate by pile fiber roots extending from the base of the film into the substrate.

22 Claims, 19 Drawing Figures

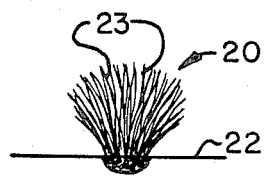
FIG. 1
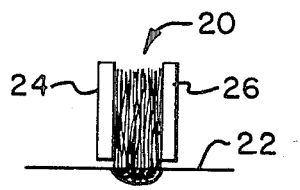
FIG. 2
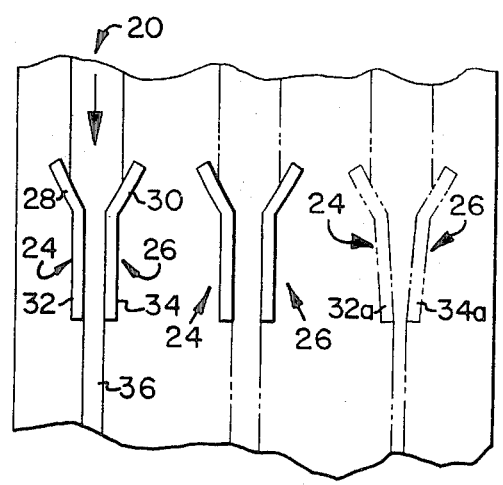
FIG. 3
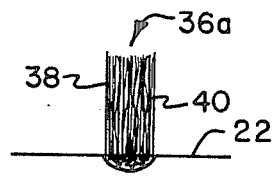
FIG. 4
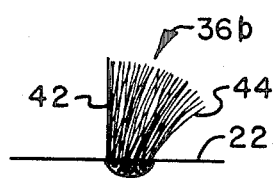
FIG. 5
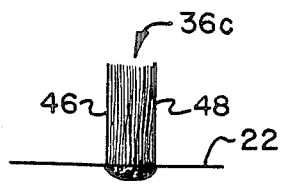
FIG. 6
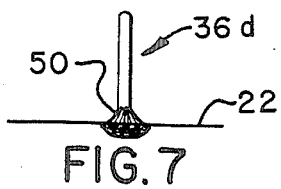
FIG. 7
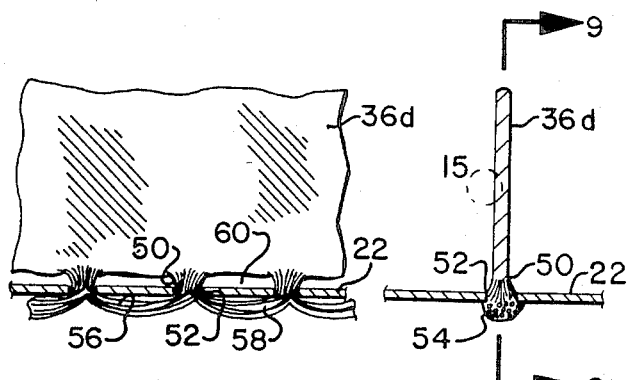
FIG. 9
FIG. 8

WEATHERSTRIPPING INCLUDING METHOD AND APPARATUS FOR THE MANUFACTURING THEREOF

FIELD OF THE INVENTION

This invention relates to weatherstripping, particularly to pile weatherstripping provided with a barrier fin, and also the method of an apparatus for manufacturing weatherstripping, particularly barrier fins and the like therefor.

BACKGROUND OF THE INVENTION

The use of weatherstripping between moving and stationary members, such as doors and windows and their surrounding frames, is well known. The functions of such weatherstripping is to reduce draughts and ingress of air, impede ingress of rain and water, and to reduce noise due to any movement of a door or window caused by wind or a source of vibration. Weatherstripping having one or more rows of upstanding pile fiber of resilient filaments is commonly employed, and such pile weatherstripping may have a barrier fin. The function of the barrier fin is to increase the imperviousness of the weatherstripping to penetration of water and air therethrough.

Disclosed in U.S. Pat. No. 3,175,256 (Horton) is a central barrier fin formed by a sheet of flexible plastic material disposed between two rows of pile fiber. In some embodiments the two spaced apart pile rows are formed on a base strip first, and then a strip of the flexible plastic material is separately inserted between the two pile rows and stuck to the base strip. In other embodiments, the barrier fin is formed first integrally with the base strip, then a row of pile fiber attached to the backing strip on each side of the barrier fin by a flocking process or by attaching strips of woven pile.

U.S. Pat. No. 3,745,053 (Johnson et al) discloses another weatherstripping product having a central barrier fin between two rows of pile fiber. The pile fiber rows are first formed on a backing strip, then an unfolded or folded strip inserted between the pile rows and adhesively attached directly to the pile fiber to form a barrier fin.

U.S. Pat. No. 3,404,487 (Johnson et al) discloses a different approach to forming a barrier fin. After attaching a body of upstanding flexible and resilient fibers to a backing strip, a coating in the form of a plastisol is applied to one or both sides of the body of upstanding fibers. The coating spans the space between adjacent fibers and between these fibers and the backing strip, and when cured forms a continuous outer film. The resultant weatherstripping product has a barrier fin along one or both sides of the central body of fibers, the fin or fins being adhered to both the outside fibers and the backing strip.

One of the problems with separately attached or adhered barrier fins, as disclosed in the above U.S. patents, is that during the wear and tear that weatherstripping can be subjected to during use between two closely fitting and relatively movable members, e.g. a door and its frame, and at times also during insertion of the weatherstripping into its retaining slot in one of such members, the barrier fin can become torn from the weatherstripping. The risk of this occurring is increased at any location where there is a defect in the adherence of the barrier fin to the weatherstripping.

To avoid the separate step involved in attaching a barrier fin, it is proposed in U.S. Pat. No. 4,352,845 (Miska) to form pile weatherstripping with one or more rows of the pile being formed from monofilament yarns having an X-shaped cross-section. These X cross-sectioned monofilaments are intended to nest or intermesh together to reduce the infiltration of air and moisture through the pile of the weatherstripping. Although this proposal eliminates the need to separately secure a barrier fin, the intermeshing X-shaped cross-section monofilaments do not form a continuous, impermeable barrier wall to substantially eliminate the passage of draughts and water therethrough.

Another proposal to eliminate the step of separately attaching a barrier fin is disclosed in U.S. Pat. No. 4,164,599 (Kessler). This proposes forming an elongate windbreak in pile weatherstripping by having in the pile a row of individual fibers which are bonded together. The fibers to be so bonded are formed from a different material than the fibers which are not bonded, and/or are coated with a bonding agent, such as a water emulsion of ethylene vinyl acetate, to which is preferably added a mixture of materials susceptible to heating by radio frequency or other electromagnetic energy. Such a "susceptor" which is responsive to an alternating magnetic field is given as gamma $Fe_2O_3$. After the weatherstripping blank has been fabricated, the whole blank is passed through a radio frequency energy generator which heats the coated fibers and causes them to adhere together while the remaining fibers remain unbonded. It is proposed in this way to form a multiplicity of generally parallel coated fibers which are bonded together to form a windbreak, which acts to support the unbonded fibers in use and acts in some measure to mitigate air and water passing through the weatherstripping. It is stated that this windbreak need not be impermeable or imperforate. As can be seen from the drawings in this U.S. Patent, many spaces still remain between the bonded fibers which will thus permit some penetration of draughts and rain. Further, it is particularly noted that the unbonded fibers should be selected so as to have no external adhesiveness when subjected to an application of such energy, and examples of such unbondable synthetic fibers are given as polyethylene and polypropylene. Examples of bondable fibers are given as nylon and polyvinylchloride.

The above proposals of Miska and Kessler, although eliminating separately attaching a barrier fin, do not provide weatherstripping having a barrier fin which is impervious to the penetration of air and water. Further, is is observed that as polypropylene and polyethylene have a lower melting point than nylon, such differential bonding of the fiber as suggested in Kessler could not be effected by directly applying heat.

SUMMARY OF THE INVENTION

To make weatherstripping by a continuous process, Applicants have realized that tufting offers greater possibilities than the conventionally used weaving approach. However, Applicants have discovered that when tufting some products, particularly when there is a high density of pile, the outer fibers of the pile rows can be untidy, in some cases tending to flop outwardly in over-bushy fashion so that they have substantially reduced sealing effect in the weatherstripping and have increased vulnerability to damage during use. This problem can also occur to differing extents with woven pile products.

Applicants have also discovered that a barrier fin comprising a continuous film can be formed in weatherstripping from a row of previously attached fibers, whether attached by tufting, weaving or otherwise.

It is an object of the present invention to provide a new process for forming a barrier fin in weatherstripping, which process is readily adaptable to continuous production.

It is a further object of the present invention to provide in weatherstripping a barrier fin which has increased resistance to being torn from the weatherstripping.

It is another object of the present invention to provide a process for improving the side edges of pile weatherstripping.

A feature by which the above objects are achieved, individually or in combination, is by compressing a row of pile fibers sideways and simultaneously applying heat to at least the outside compressed fibers.

Accordingly, therefore, there is provided by the present invention a method of manufacturing weatherstripping comprising the steps of forming a row of pile fiber on a substrate, compressing the row widthwise between a pair of dies while moving the row of pile fiber therebetween, heating the row while so compressed to change at least one characteristic of said row, and thereafter cooling the pile fibers so heated. In this way either outside fibers can be heat set to cause them to stand upright neatly, or a film can be formed from outer fibers, or the complete row of pile fibers can be formed into a continuous barrier film depending upon the degree of compression, temperature and time of heating employed. Thus, the characteristics of the row that can be changed in this way are the appearance and uprightness of one or both sides of the row, the construction of one or both sides of the row changing from individual fibers to a film skin, and the construction of the whole row with the individual fibers being transformed into a single film-like barrier fin.

Preferably, one or both of the dies are heated, and the fibers heated by conduction from the heated die or dies.

The temperature and duration of the heating may heat the fibers, or the fibers to be transformed, to their sticking point but to below their melting point. With some types of fibers having two or more components of different polymers, the heating may be to the melting point of one such component but below the melting point of the other component or components. The material of the pile fiber may be heated to or above its melting point when it is desired to make a clear film from crystalline synthetic, i.e. man made, fibers.

It is believed that if relative movement occurs between the fibers and the surface of the dies, while the row is being subjected to sideways pressure from the dies, an improved formation of a continuous film occurs.

Preferably, the pile fiber is formed on the substrate by tufting, and the tufts may be cut to produce a cut pile. One, two, three or more rows of tufts may be simultaneously inserted to form a single pile weatherstripping product. With such product, one or both of the outside surfaces of the pile may be heat set or converted into a continuous film. In a preferred embodiment, a single row of tufts is converted completely into a continuous film barrier fin, and thereafter a further row of pile fiber may be formed on the substrate on one or both sides of this barrier fin. Such further row or rows may be formed by flocking or tufting, or may even be tufted simultaneously with the single row which would then be compressed and heated between dies while the outer row or rows were present and deformed outwardly away from the dies.

Advantageously, conjugate yarns can be used for the fibers to be converted into a film. Such yarns have continuous filaments each comprising two components of different materials having different melting points. Preferably such conjugate yarns have a core and sheath construction with the material of the surrounding sheath having a lower melting point than the material of the core. For example, such conjugate yarns could have filaments in which a polypropylene core is surrounded by a polyethylene sheath; the polyethylene has a lower melting point than the polypropylene, and heat should preferably be applied directly to the conjugate fibers at a temperature below, for example 30° to 80° F. (17° to 45° C.) below, the melting point of the polyethylene to change the characteristics of the sides of row of pile, and to between 250° F. to 290° F. (120° to 145° C.) to change the row of pile into a film by melting the polyethylene but not the polypropylene.

A barrier fin formed according to the invention as a continuous film from a tufted pile, is connected to the substrate by fiber roots extending from the base of the film through and beneath the substrate. After a subsequent tuft locking step, e.g. application of a layer of adhesive or hot melt to the back of the substrate or primary backing, these fiber roots provide a very strong attachment of the barrier fin which can withstand severe treatment during assembly and use without risk of the barrier fin tearing or being separated from the substrate.

According to another aspect of the present invention, there is provided an apparatus for producing weatherstripping comprising a tufting machine having a reciprocating needle bar, means for moving a primary backing fabric through the tufting machine in a lengthwise direction, a plurality of pairs of dies disposed across the width of the tufting machine downstream of the needle bar, each pair of dies being disposed to contact opposite sides of a row of tufted pile inserted in the primary backing by the needle bar, means located adjacent the pairs of dies on the opposite side thereto of the primary backing fabric for urging the primary backing fabric towards each pair of dies as a row of tufted pile passes therebetween, and means for heating the rows of tufted pile as opposite sides thereof are contacted by the pairs of dies.

Other objects, features and advantages of the present invention will become more fully apparent from the following detailed description of the preferred embodiments, the appended claims and the accompanying drawings.

BRIEF DESCRIPTION OF THE DRAWINGS

In the accompanying drawings:

FIG. 1 is a diagrammatic end view of a row of pile fiber extending upwardly from a substrate;

FIG. 2 is a diagrammatic end view of the row of pile fiber of FIG. 1 passing between a pair of dies;

FIG. 3 is a plan view of FIG. 2 also showing further pairs of dies;

FIG. 4 is a diagrammatic end view of the row of pile fiber of FIG. 1 after having been processed in a first way in accordance with FIGS. 2 and 3;

FIG. 5 is the row of pile fiber of FIG. 1 having been processed in a second way in accordance with FIGS. 2 and 3;

FIG. 6 is the row of pile fiber of FIG. 1 having been processed in a third way in accordance with FIGS. 2 and 3 to form side films;

FIG. 7 is the row of pile fiber of FIG. 1 having been processed in a fourth way in accordance with FIGS. 2 and 3 to form a barrier fin;

FIG. 8 is a cross-section of the product of FIG. 7 showing the barrier fin and the substrate on a larger scale;

FIG. 9 is a side view of the product of FIG. 7 and 8;

DETAILED DESCRIPTION OF THE PREFERRED EMBODIMENTS

Figure 10:
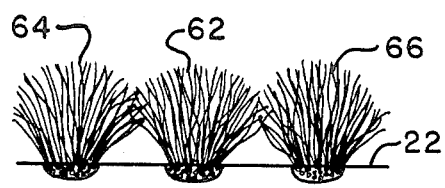
FIG. 10 is a diagrammatic end view showing three adjacent rows of pile fiber extending from a substrate.

Embodiments of the invention to produce weatherstripping, or an intermediate product in the production of weatherstripping, from a single row of pile fiber will be described first in relation to FIGS. 1 through 9.

FIG. 1 diagrammatically illustrates a single row of pile fiber 20 extending upwardly and outwardly from a substrate 22. Across the width of the row of pile fiber 20 there are a plurality of individual filaments or fibers 23. The number of these filaments will depend upon the overall denier of the pile row and the denier of the individual filaments or fibers. For example, the width of the pile row may contain 24 filaments, or 70 filaments, or between 100 and 200 individual filaments. The pile row 20 may be formed by cut picks of a woven fabric, in which case the substrate 22 would be the base woven fabric. Alternatively, the pile row 20 could be formed by flocking staple fibers onto the substrate 22. Preferably, the pile row 20 is formed by tufting multi-filament yarn into a woven or non-woven polypropylene primary backing fabric. The row of tufts so formed are preferably cut to form a cut pile, or may be left uncut to form a row of looped pile. The substrate 22 may be a thin strip having just the single row of pile fiber 20 extending therefrom, or may be a wide strip having a plurality of parallel rows of pile fiber across the full width thereof, the pile row 20 then only representing one of such rows.

FIG. 2 illustrates the pile row 20 of FIG. 1 passing between and being widthwise constrained by a pair of stationary plate-like dies 24, 26. FIG. 3 illustrates in plan view the pile row 20 passing between the pair of dies 24, 26. The pile row 20 passes between the dies 24, 26 in the direction of the arrow, the entrance end section 28, 30 of each die 24, 26, respectively, being flared or inclined outwardly to form an entrance throat. The remaining sections 32, 34 of the dies extend parallel to each other and the row of pile fiber, and are spaced apart a predetermined distance, which is less than the width of the row of pile fiber 20. As can be seen at 36, the row of pile fiber 36 exiting from the dies 24, 26 after having been acted upon thereby is less than the bushy row of pile fiber 20 entering the throat 28, 30 of the dies. Instead of being exactly parallel, the sections 32, 34 can slightly converge if an increase in pressure throughout the passage of the pile row is required; a pair of dies having such converging sections 32a, 34a are shown in broken lines on the right hand side of FIG. 3. This continuously converging arrangement is preferable with pile rows of high density.

The pair of dies 24, 26 perform two functions upon the pile row 20. Firstly, they compress the pile row in width, and in this respect the throat formed by the diverging die parts 28, 30 both guides the pile row 20 into the center between the pair of dies 24, 26, and also effects a gradual compression of the width of the pile row. Secondly, one or both of the dies 24, 26 are heated at a controlled temperature to heat one or both sides of the compressed pile row. After the compressed and heated pile row 36 exits from the dies 24, 26 it is cooled. This cooling can be effected by passing it through ambient air for a period of time, or by directing cooling air against and over the heated pile row 36.

The filaments 24 of the pile row 20 comprise thermoplastic material, for example, polyester, or polypropylene. Preferably, they consist of polypropylene or each has a component of polypropylene, and the polypropylene may advantageously be UV stabilized and contain a silicon additive. The filaments are preferably texturized and of round cross-section. However, they may have a modified cross-section, and may be drawn but untexturized, such as in the case of conjugate yarns as will be more fully described later. FIG. 3 also shows further pairs of dies 24, 26 spaced transversely across the substrate treating further parallel pile rows, the spacing between and flaring of the dies being exaggerated for clarity.

The product of FIG. 4 is obtained by applying only light compression to the fiber row 20 by the dies 24, 26, and simultaneously heating the dies 24, 26 to a relatively low temperature, well below the softening point of the filaments 24, so that the pile row 20 is subjected to a slight compression and low temperature treatment. Such treatment heat sets the outside filaments 38, 40 of the treated pile row 36a so that these remain standing upright after treatment, as opposed to previously having occupied a flared or bent-over, more bushy configuration—as can be understood by comparing FIG. 4 with FIG. 1. During this heat setting of the outer filaments 38, 40 some filaments may stick or adhere together, particularly some adjacent filaments along the length of the row 36a, and also some filaments immediately inside and adjacent the filaments 38, 40 in the widthwise direction of the row 36a. The effect of this mild heat and pressure treatment is to give the treated row 36a an improved, neater and more uniform appearance, and also to decrease its overall width, i.e. the width of the bushy top of the row. The treated row 36a exhibits more integrity when deformed, e.g. when a window or door it is sealing is opened or closed, and also exhibits greater resiliency in returning to its original configuration after being so deformed.

To produce the product shown in FIG. 5, the dies 24, 26 are set to again apply a light compression to the pile row 20, the die 24 is heated to a relatively low temperature, and the die 26 is not heated. This has the effect of heat setting the outer filaments 42 on the left hand side of FIG. 5, but not heat setting the outer filaments 44 on the right hand side of FIG. 5. Consequently, the heat set outer filaments 42 stand upright in the so treated pile row 36b, but the unheated outer filaments 44 return to their outwardly flared, more bushy disposition the same as they originally occupied in FIG. 1. Again, some of the outer filaments 42 will stick or adhere to each other. Thus, the treated row 36b has one neat, more resilient, upright side and a floppier, more bushy side. When in use as a weatherstrip, preferably the upright side 42 is directed outwards towards the weather side of the window or door upon which it is used.

In the product of FIG. 6, the dies 24, 26 are adjusted to effect medium compression of the pile row 20, and both dies are heated to a medium temperature, below but nearer to the melting temperature of the filaments 23. With these settings, the outer filaments on each side of the so treated pile row 36c soften and completely adhere to each other to form, when cooled, a thin, rather fragile film 46, 48 on each side of the treated pile row 36c. In this way, a weatherstripping product can be produced which has a thin barrier fin 46, 48 on each side of a central portion of individual fiber filaments. The overall width of the treated pile row 36c is less than the more bushy untreated pile row 20 (FIG. 1). Except where the individual filaments enter the substrate 22, the filaments in the outer rows completely coalesce so that the barrier fins 46, 48 are formed by thin, continuous films. By increasing the compression of the dies 24, 26, and also increasing their temperature, the barrier fins 46, 48 can be increased in thickness, that is, the number of filaments that are caused to adhere and coalesce together is increased.

FIGS. 7, 8 and 9 show the product produced by setting the dies 24, 26 to compress the pile row 20 to a medium to high compression, at the same time subjecting the compressed pile row to a higher termperature approaching the melting point of the material of the filaments 23. With this higher pressure and higher temperature, all the filaments 23 are softened and caused to fuse to each other to form a single, more substantial barrier fin 36d. The barrier fin 36d is formed as a relatively strong and stable continuous film, the base of this film being connected to the substrate 22 by unadhered, individual filaments 50. FIG. 8 illustrates on a larger scale the solid single barrier fin 36d with the individual fibers 50 extending from the bottom through a hole 52 in the substrate 22 with a knuckle or loop 54 of individual filaments below the substrate 22. FIG. 9 shows in side view a portion of the barrier fin 36d along its length intermittently connected to the substrate 22 by groups of individual filaments 50, these groups of filaments being connected together below the substrate 22 as at 56 and 58. Between a pair of adjacent groups of anchoring filament roots 50 there is a small clearance 60 between the substrate 22 and the base of the barrier fin 36d. Later, after a tuft locking step has been performed (e.g. latexing, hot melt, or knuckle deformation by heat and pressure), the barrier fin 36d is integrally attached to the substrate 22 by the anchor groups of filaments 50 and the multi-filament loops or knuckles 56, 58 on the reverse side of the substrate 22. With this product, a strong, in fact fiber reinforced, barrier fin 36d is formed which has extremely high resistance to being separated or torn from the substrate 22 in use as or in a weatherstrip when subjected to relative motion between a door or window and its frame. Such barrier fin 36d can be used in a weatherstrip by itself, but preferably has an additional row of pile fiber on one or both sides of the barrier fin 36d. Such side rows of pile fiber can more conveniently be inserted after the barrier fin 36d has been formed.

Figure 11:
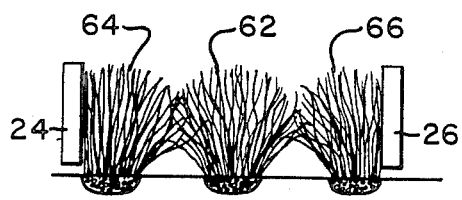
FIG. 11 is a diagrammatic end view showing the three pile rows of FIG. 10 passing between a pair of dies.
Figure 12:
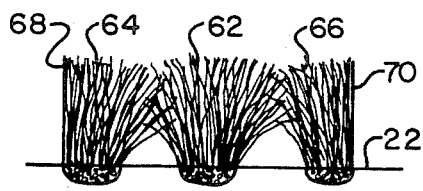
FIG. 12 is a diagrammatic end view of the rows of pile fiber of FIG. 10 after having been subjected to a process in accordance with FIG. 11.

FIGS. 10 to 13 illustrate the formation of weatherstrip products having three adjacent rows of fiber pile. As described above, each pile row can be formed by weaving, tufting, or flocking. FIG. 10 shows an end view of the three rows, a central pile row 62 having on each side an outside pile row 64, 66, all three rows being attached to the substrate 22. FIG. 11 shows the three pile rows 64, 62, 66 being passed between and compressed sideways by the pair of dies 24, 26. With the dies 24, 26 adjusted to apply a medium pressure inwards against the outside pile rows 64, 66, and the temperature of the dies 24, 26 set at a medium to medium/high temperature, for example, 30° F. (17° C.) below to just above the melting point of the material of the fibers, a product as shown in FIG. 12 is obtained. With this product, as shown in FIG. 12, the fibers on the outer sides of the outer pile rows 64, 66 have been caused to soften, adhere together and partially melt to form outer barrier fins 68, 70, respectively. These fins 68, 70 will appear as continuous thin films attached at their base by fiber roots passing into the substrate 22, similar to the fiber roots 50 shown in FIG. 9. On the inside of each of these fiber-reinforced films 68, 70 some of the fibers in the middle portion of the fiber rows 64, 66 will be adhered or partially adhered. However, none of the fibers in the center row 62 will be adhered together and will be individually free still forming a center row which is resilient and bushy. This product can be employed in weatherstripping where a draught and water barrier fin is required along each outside edge.

Figure 13:
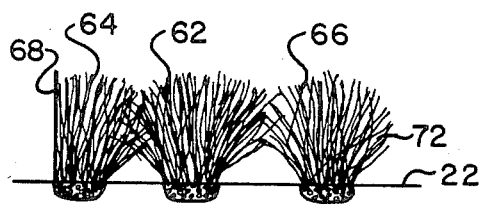
FIG. 13 is a diagrammatic end view of the rows of pile fiber of FIG. 10 having been subjected to another process in accordance with FIG. 11.

The product shown in FIG. 13 is produced similarly to that of FIG. 12, except only the left hand die 24 is heated, the right hand die 26 being unheated. With this product a continuous film barrier fin 68 is formed by the outside fibers of the pile row 64, whereas the opposite outside pile row 66 has returned to its outwardly overhanging bushy configuration. As can be seen, the outside fibers 72 of the pile row 66 bush outwardly in a similar configuration to that which they occupied in FIG. 10 before being passed between the dies 24, 26. This product is used in weatherstripping where a wider bushy weatherstrip is required with a barrier fin on the outside only.

Figure 14:
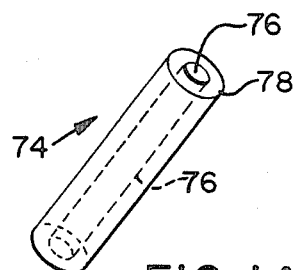
FIG. 14 is a perspective view on an enlarged scale of a length of a filament of conjugate fiber.

FIG. 14 illustrates a length of one type of conjugate filament 74 in which a central round cross-section core 76 of one thermoplastic material is surrounded by a cylindrical sheath 78 of another type of thermoplastic material, both thermoplastic materials having been simultaneously extruded to form the filament 74. With the present invention, the outer sheath 78 should be of a material that has a lower melting point than that of the inner core 76. Preferably, the outer sheath 78 is polyethylene and the inner core 76 is polypropylene. As polyethylene melts at about 248° F. (120° C.) and homopolypropylene melts at about 329° to 338° F. (165° to 170° C.) it will be clear that when this conjugate filament is subjected to a temperature about 230° F. (110° C.) the polyethylene sheath will soften and become sticky whereas the polypropylene core 76 will remain intact. Further, if the filament is subjected to a temperature of about 266° F. (130° C.) the polyethylene sleeve 78 will start to melt and start to flow, whereas the polypropylene core 76 will remain solid and intact. A 2,500 denier multi-filament yarn of such conjugate polyethylene/polypropylene filaments is made and sold by Imperial Chemical Industries, Harrogate, England, under the trademark Hetrofil. Such multi-filament conjugate yarn is drawn but untexturized.

Figure 15:
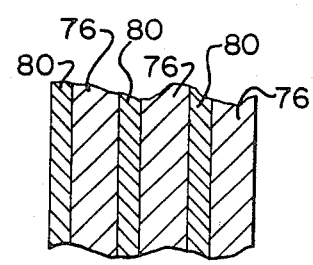
FIG. 15 is a fragmentary section of the area 15 in FIG. 8 when conjugate fiber is employed.

Conjugate multi-filament yarns are excellent for forming barrier fins from pile rows in accordance with the invention. The temperature and pressure of the dies 24, 26 is chosen so that the polyethylene softens and adheres or even melts, but the polypropylene does not become softened. In the product of FIGS. 7, 8 and 9, if the pile row were made from such multi-filament conjugate yarn of polyethylene sheath and polypropylene core, then FIG. 15 would represent an enlarged section taken within the circle 15 in FIG. 8. The polypropylene cores 76 of the individual conjugate filaments would still remain intact in the barrier fin 36d. However, the polyethylene sheaths 78 of the individual conjugate fibers would have melted or partially melted and flowed to encompass all the propylene cores in a continuous mass 80 of polyethylene. The high pressure exerted by the dies 24, 26 causes the polyethylene to flow into all the spaces between the individual filaments and fill them, so forming a continuous film of polyethylene reinforced by upright polypropylene filaments. The outer surface of the so formed barrier film would be formed by a layer of polyethylene 80, as shown in FIG. 15. Such a filament reinforced film has good integrity and tear resistance.

In the product of FIG. 12, multi-filament yarns having conjugate filaments with polyethylene sheaths and polypropylene cores could advantageously be employed in each outer pile row 64, 66, and a texturized multi-filament polypropylene yarn employed for the center pile row 62. Similarly, in the embodiment of FIG. 13, the outer pile row 64 is preferably made from such a multi-filament conjugate yarn, and the other outer pile row 66 and the center pile row 62 made from a texturized multi-filament polypropylene yarn.

Figure 16:
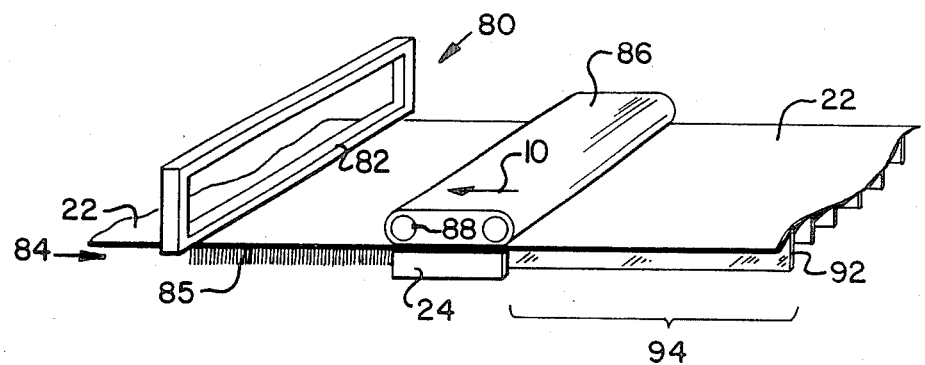
FIG. 16 is a diagrammatic perspective view of a tufting machine modified to carry out the process of the present invention.
Figure 17:
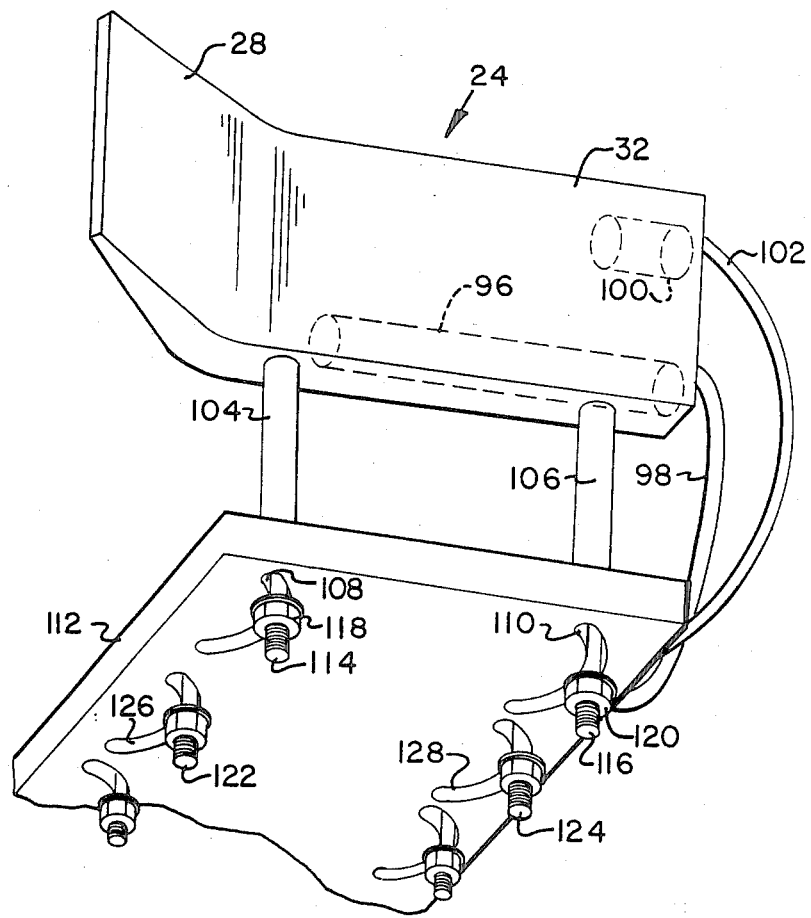
FIG. 17 is a perspective view from underneath, on a larger scale, of one of the dies of FIG. 16.
Figure 18:
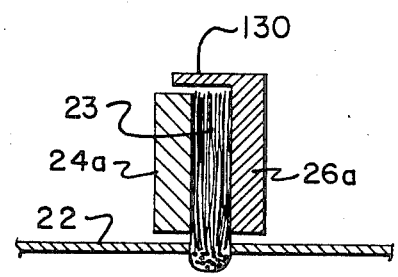
FIG. 18 shows diagrammtically a cross-sectional view of a modified pair of dies for carrying out the process of the present invention to produce the product of FIG. 7.

An apparatus for carrying out the method of the present invention is illustrated in FIGS. 16, 17 and 18.

FIG. 16 shows a tufting machine having a frame 80 in which a needle bar 82 is reciprocated upwards and downwards. The substrate fabric is fed from a supply roll to and past the needle bar 82 in the direction of the arrow 84. The needle bar 82 inserts a plurality of rows of tufts 85 downwardly through the substrate 22. As these tufts are formed around loopers, they are cut in a similar manner as to when producing a conventional cut pile tufted carpet. The downwardly facing parallel rows of tufts 85 then pass between a plurality of pairs of dies, each pair being similar in plan view to the pairs of dies 24, 26 in FIG. 3, only one die 24 being visible in FIG. 16. Above these pairs of dies, and extending transversely across the width of the substrate 22, is an endless belt 86 driven in the direction of the arrow 10 around rollers 88. The function of this belt 86 is to press the substrate 22 firmly downwards while the pile rows of tufts 85 are being drawn between the pairs of dies 24, 26 and compressed widthwise thereby. This also provides a degree of temporary tuft locking while the pile rows are being acted upon by the dies. The leading edge of the endless belt conveyor 86 is preferably spaced downstream about one to two feet from the needle bar 82. As the heated pile rows exit from the dies 24, 26, the substrate 22 is drawn through a cooling zone 94 of sufficient length to enable the barrier fins 92 now formed to cool and set.

FIG. 17 illustrates in perspective view one of the dies and its manner of mounting and adjustment. The die illustrated is the outside die 24 that can be seen in FIG. 16. As is shown also in FIG. 3, the die 24 is plate-like and has a main straight body portion 32 with an lead-in portion 28 which is towed or inclined outwardly. In a bore in the body portion 32 is inserted a cartridge heater 96 as shown in broken lines. In a shorter bore in the body portion 32, above and spaced from the cartridge heater 96, is inserted a thermostat 100. Power is supplied to the cartridge heater 96 by an electric lead 98, the supply of this power being controlled by the thermostat 100 which is connected via an instrument wiring cable 102 to a switching arrangement supplying the heater cable 98. The die 24 is rigidly mounted on the upper end of two parallel rods 104, 106 which extend downwardly through arcuate slots 108, 110, respectively, in a support plate 112. The lower ends 114, 116 of the rods 104, 106 are screw threaded and have nuts 118, 120 threaded thereon which when tightened firmly secure the rods 104, 106 to the support plate 112. This support plate 112 extends transversely the full width of the endless belt conveyor 86 and is spaced several inches below the substrate 22. All of the dies 24, 26 are similarly mounted on pairs of rods extending downwardly through pairs of arcuate slots in the support plate 112. The screw threaded ends 122, 124 of the pair of rods supporting adjacent and oppositely towed die 26 can be seen locked in place and extending through a pair of arcuate slots 126, 128. By loosening the nuts 118, 120 for any such pair of dies 24, 26, the rods 102, 106 etc. can be moved in the arcuate slots 108, 110 etc. to both center the pair of dies 24, 26 with respect to pile row or rows to be passed therebetween, and to set the pair of dies the pre-determined distance apart to effect the desired compression of the pile row or rows to be passed therebetween. Although it is preferred that the body sections 32, 34 of each pair of dies 24, 26 are adjusted to be parallel to each other, there are occasions when effecting a high degree of compression, that it may be desirable to arrange the trailing rods 106 to be slightly closer together than the leading rods 104 so that the body sections 32, 34 tow-in slightly towards each other; in this way, an initial degree of compression is effected by the flared apart forward portion 28, 30 (see FIG. 3), and then a final degree of compression is progressively accomplished as the pile passes between the slightly converging body portions 32, 34.

In operation, the pairs of dies 24, 26 can be adjusted and arranged so as to operate upon all the rows of pile 85 extending downwardly from the substrate 22, or so as to operate upon only selected rows of pile, depending upon the final weatherstripping product being produced.

FIG. 18 shows a modification to a pair of dies particularly intended for producing the product of FIGS. 7, 8 and 9. This modified pair of dies 24a, 26a has one of the pair 26a slightly higher than the other, and this higher die 26a has inwardly extending from the top thereof, and at right angles thereto, an integral top flange 130 which extends partly across the top of the shorter die 24a. This flange 130 forms a roof to the cavity between the dies 24a, 26a and contacts the top ends of the filaments 23 of the pile row compressed between the dies 24a, 26a. The function of this roof flange 130 is to ensure that the top of the barrier fin 36d (see FIG. 7) is formed as a smooth straight surface. This improves both the appearance and the integrity of the top of the barrier fin. The flange 130 is arranged to overlap the top of the die 24a to enable the width between the dies 24a, 26a to be adjusted while still maintaining the top of the cavity between the dies 24a, 26a closed.

Figure 19:
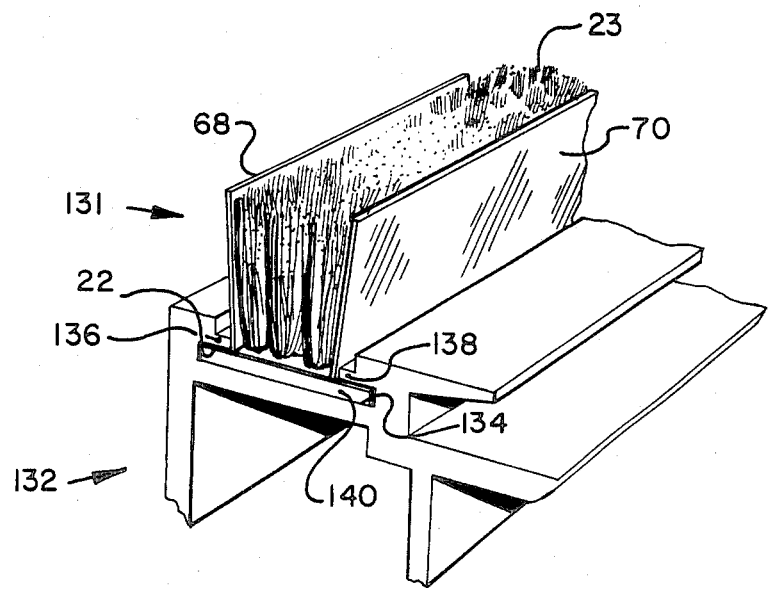
FIG. 19 is a fragmentary perspective view of a length of weatherstripping made in accordance with the present invention and inserted in a seating in an aluminum window frame.

FIG. 19 illustrates a completed weatherstrip 131 according to the invention inserted in an aluminum window frame 132. The frame 132 has a slot 134 therein in which is slid the base strip of the weatherstrip 131 with the outwardly extending edges of this base strip engaging under and being retained by inwardly projecting flanges 136, 138 of the channel 134. The weatherstripping 131 has been made in accordance with FIGS. 11 and 12, and the lower portions of the two outer barriers 68, 70 engaged against the flanges 136, 138. Between the outer barrier films 68, 70 the filaments 23 of the three pile rows 64, 62, 66 can be seen. The base strip of the weatherstrip 131 is formed by a strip of the substrate 22 to the underside of which has been adhered a strip of polypropylene 140 which functions as a secondary backing for the tufted pile, the substrate 22 functioning as the primary backing. Preferably, the primary backing 22 is a non-woven polypropylene fabric, such as TYPAR, a trademark of DuPont De Nemours E.I. Co., and if desired the secondary backing 140 can be formed by a layer of hot melt. Obviously, for a narrower weatherstrip product, the center pile row 62 could be omitted, and only two pile rows 64, 66 employed, the filaments 23 retained between the outer barrier fins 68, 70 being formed by the free individual filaments of the inner portions of the pile row 64, 66.

Specific examples to further illustrate how the present invention can be carried out will now be described.

EXAMPLE 1

Using the apparatus of FIGS. 16 and 17, parallel spaced apart rows of pile fiber should be tufted into a non-woven polypropylene backing with the loops being cut to form rows of cut pile. The yarn so tufted should be 2,500/250 denier multi-filament conjugate yarn in which each filament has a polypropylene core surrounded by a polyethylene sheath, such as supplied by Imperial Chemical Industries under the trademark Heterofil. The pairs of dies 24, 26 should be set a distant apart to lightly compress each pile row, such compression only being sufficient to straighten up the outside curved-over filaments. For example, with an overall width of a bushy pile row being 0.120 inches, the base or roots of the pile tufts having a width of 0.030 inches, the body portions 32, 34 of each pair of dies should be disposed parallel and a distance apart of approximately 0.080 inches. The temperature of each die should be controlled in the range of 220° F. to 230° F. (104° to 110° C.), and with the dies each having the body portion 32, 34 six inches long, the substrate 22 should be advanced at a speed of six feet per minute giving a heating time of five seconds for the pile rows compressed between the pairs of dies. With these settings, a product as illustrated in FIG. 4 will be obtained, the outside filaments having been heat set in a substantially upright position, with some of such filaments becoming adhered to others.

EXAMPLE 2

To produce the product illustrated in FIG. 6, the same process and settings should be used as described for Example 1, except the pairs of dies 24, 26 would each be set to a temperature in the range 235° F. to 245° F. (123° to 118° C.) and the distance between the pairs of dies 24, 25 would be slightly decreased to about 0.040 inches so as to impose a medium pressure against the sides of each pile row. To increase the thickness of the fragile films 46, 48, the temperature of the dies would be increased to the range of 245° to 250° F. (118° to 121° C.) and the speed of advancement of the primary backing 22 decreased to three feet per minute, with a consequential reduction in the speed of sewing of the needle bar 82.

EXAMPLE 3

To produce the product illustrated in FIG. 7, the same materials and conditions as Example 1 should be employed, except the temperature of the dies would be increased to the range 250° F. to 320° F. (121° C. to 160°) and the distance between each pair of dies 24, 26 should be decreased to 0.020 inches in order to apply a high pressure to the outer sides of each pile row. The weatherstripping can then be completed by attaching a row of textured mult-filament polypropylene yarn on each side of the already formed center barrier fin 36d, and then adhering a secondary backing of polypropylene sheet onto the primary backing to both give the product stability and lock the looped ends 56, 58 of the tufts in place. The individual weatherstrips are then slit from the width of the sheet product so formed. If a die temperature much above 300° F. (149° C.) is used, for example, 320° F. (160° C.), the polypropylene cores will soften and start to shrink, still producing a well formed barrier fin 36d, but of a lower height.

EXAMPLE 4

To make the product illustrated in FIG. 7, but this time from a texturized multi-filament polypropylene yarn having UV stabilization and a silicone additive, such as the 1050/70 denier polypropylene yarn made and supplied by Phillips Fiber Corporation of Greenville, S.C., the speeds and settings of Example 3 should be employed, but the temperature of the dies set in the range 310° F. (154° C.) to 325° F. (163° C.) and the distance between the dies 24, 26 reduced to 0.010 inches. The individual polypropylene filaments become softened and are compressed with the medium to high compression of the dies into a clear strong film of acceptable thickness. The UV additive is included in the polypropylene to resist degradation of the weatherstrip product in use by sunlight. The silicone additive aids in the ability of the film to repel water, but is also believed to improve the quality of the barrier film formed from the individual polypropylene filaments.

Although it is preferred to form the film in the product of FIG. 7 to a thickness of approximately 0.015 inches, it is also possible to form thinner films, such as in the range 0.005 to 0.008 inches.

Weatherstripping with a central barrier fin can be manufactured by attaching to the substrate a row of pile on one or both sides of the film barrier fin 36d of FIG. 7. This can be done in various ways, for example flocking, adhesively attaching a strip of woven pile, etc. However, such outside pile row or rows can advantageously be formed by tufting, the substrate 22 with downwardly projecting films 92 in FIG. 16 being passed through a second tufter head with grooves or slots in its needleplate to accommodate the films 92. The manner of doing this is described and shown in detail in our copending Patent Application Ser. No. 06/640,667 filed Aug. 14, 1984 filed concurrently herewith and entitled "Tufting Process And Apparatus For Manufacturing Weatherstripping", the disclosure in which is hereby incorporated herein by reference.

It will be appreciated that the present invention provides an economical and efficient way of forming one or more barrier fins in a weatherstripping product, and that the barrier fins so formed are strongly attached to, and in fact form an integral part of, the final weatherstripping product.

The above described embodiments, of course, are not to be construed as limiting the breadth of the present invention. Modifications, and other alternative constructions, will be apparent which are within the spirit and scope of the invention as defined in the appended claims.

For example, although the use of heated stationary dies 24, 26 has been described, it is possible to use rotating dies. Each pile row could be compressed between a pair of rotatable, heated rollers. Such rollers could be freely rotatable and be rotated by the passage of the pile rows therebetween. However, to improve their film forming function, it is preferable to have the rollers rotate at a slightly different speed from that of the pile rows so that there is a relative sliding movement between the surface of each roller and the side edge of the pile row upon which it presses. Preferably, the heated rollers should be positively driven at a peripheral speed which is slower than the linear speed of the substrate, for example 20% slower. This relative motion between the heating surface and the side of the pile row, such as also obtained with the stationary dies 24, 26, effects a smearing action which aids the formation of the resultant film and also enables the thermoplastic material of the pile fibers to be moulded at temperatures below the melting point thereof.

What is claimed is:

1. A weatherstripping product, comprising:
   a substrate strip;
   a barrier fin upstanding from and attached to said substrate strip; and
   said barrier fin comprising a film formed from pile fiber, the film being attached along its length to said substrate strip by fiber extending integrally from said film.

2. The weatherstripping product of claim 1, wherein said fiber extending from said film passes through said substrate and is integral with other such fiber extending from said film and through said substrate at an adjacent but separate location.

3. The weatherstripping product of claim 2, further comprising a row of pile fiber adjacent said barrier fin and attached to said substrate strip.

4. The weatherstripping product of claim 3, further comprising a second such barrier fin, said row of pile fiber being disposed between the two barrier fins.

5. The weatherstripping product of claim 1, wherein said fiber comprises conjugate filaments of polypropylene and polyethylene.

6. A method of manufacturing weatherstripping, comprising the steps of:
   forming a lengthwise row of pile fiber on a substrate;
   passing said row lengthwise between a pair of dies by relative movement between said row and said dies;
   compressing said row widthwise with said dies while passing therebetween;
   heating at least one of said dies to heat at least one side of said row; and
   forming the pile fiber at least on said one side of said row into a film by said compressing and said heating in conjunction with said relative movement between said row and said dies.

7. The method of claim 6, wherein said row is subsequently cooled by ambient air.

8. The method of claim 6, wherein said row is formed by tufting.

9. The method of claim 8, wherein tufts formed by said tufting are cut to form cut pile before said row is compressed.

10. The method of claim 6, wherein said pile fiber comprises conjugate filaments.

11. The method of claim 10, wherein said conjugate filaments comprise a polypropylene core surrounded by a polyethylene sheath.

12. The method of claim 6, wherein the material of said pile fiber comprises polypropylene containing a UV stabilizer and a silicone additive.

13. The method of claim 6, wherein said pair of dies are stationary and said row moves.

14. The method of claim 6, wherein both of said dies are heated and opposite sides of said row are both heated by contact with said dies.

15. The method of claim 6, wherein said row comprises in the widthwise direction a plurality of individual rows of tufts, and said heating step comprises heating at least the outer side of an outer row of tufts, to form at least the outer portion of that outer row into a film.

16. The method of claim 6, wherein said row is formed by tufting a multi-filament yarn comprising polypropylene into said substrate, and immediately thereafter passing said substrate past said both dies with said row moving therebetween, said dies being heated to a temperature in the range of 220° F. to 325° F., and allowing the heated row to cool in ambient air as said substrate continues to move.

17. The method of claim 16, wherein said temperature is in the range of 310° F. to 325° F. and said row is completely transformed into a film.

18. A method of manufacturing weatherstripping, comprising the steps of:
   forming a lengthwise row of pile fiber on a substrate;
   passing said row lengthwise between a pair of dies by relative movement between said row and said dies;
   compressing said row widthwise with said dies while passing therebetween;
   heating said dies to heat opposite sides of said row during said compressing thereof;
   forming said row of pile fiber into a continuous film by said compressing and said heating in conjunction with said relative movement between said row and said dies; and
   cooling said film.

19. The method of claim 18, further comprising the step of contacting a top surface of said row with a die during said compressing and heating of said row to form a smooth straight surface along a top edge of said film.

20. A method of manufacturing weatherstripping, comprising the steps of:
   forming a lengthwise row of pile fiber on a substrate;
   passing said row lengthwise between a pair of dies by relative movement between said row and said dies;
   compressing said row widthwise with said dies while passing therebetween;
   heating at least one of said dies to heat outside fibers on at least one side of said row to heat set said outside fibers and cause them to stand upright neatly; and
   cooling said heat set outside fibers.

21. An apparatus for producing weatherstripping, comprising:
   a tufting machine having a reciprocating needle bar;
   means for moving a primary backing fabric through the tufting machine in a lengthwise direction;
   pairs of dies disposed across the width of said tufting machine downstream of said needle bar, each pair of dies being disposed to contact opposite sides of a row of tufted pile inserted in said primary backing fabric by said needle bar;
   means, located adjacent said pairs of dies but on the opposite side of said primary backing fabric to said dies, for urging said primary backing fabric towards each said pair of dies as said row of tufted pile passes therebetween; and
   means for heating each said row as the opposite sides thereof are contacted by a said pair of said dies.

22. The apparatus of claim 21, wherein said urging means comprises an endless belt, the distance between each pair of dies is adjustable, said heating means comprises heaters located in said dies, and further comprising means for controlling the temperature to which said heaters heat said dies.

* * * * *